United States Patent [19]
Kleinknecht et al.

[11] Patent Number: 6,160,039
[45] Date of Patent: Dec. 12, 2000

[54] PROCESS FOR THE PRODUCTION OF MASTERBATCHES CONTAINING SHORT FIBRES OR PULPS

[75] Inventors: Harald Kleinknecht, Alzey; Andreas Schuch, Schwetzingen; Iris Degen, Schwetzingen-Hirschacker, all of Germany

[73] Assignee: Rhein Chemie Rheinau GmbH, Manheim, Germany

[21] Appl. No.: 09/259,208

[22] Filed: Mar. 1, 1999

[30] Foreign Application Priority Data

Mar. 6, 1998 [DE] Germany .................. 198 09 670

[51] Int. Cl.[7] ............................ C08J 3/22
[52] U.S. Cl. .............. 523/333; 524/847; 525/131; 525/166; 525/177; 525/187; 525/189; 525/240; 525/241; 525/324; 525/420; 525/424; 525/425; 525/426; 525/432; 525/437; 525/440; 525/444; 525/445; 525/935

[58] Field of Search .................... 525/131, 166, 525/177, 187, 189, 240, 241, 324, 420, 425, 424, 426, 432, 444, 437, 445, 440, 935; 523/333; 524/847

[56] References Cited

U.S. PATENT DOCUMENTS

| | | | |
|---|---|---|---|
| 4,263,184 | 4/1981 | Leo ........................................ | 525/935 |
| 5,205,972 | 4/1993 | Kafka ..................................... | 264/101 |
| 5,205,973 | 4/1993 | Kafka ..................................... | 264/101 |
| 5,391,623 | 2/1995 | Frances ................................... | 525/184 |
| 5,480,941 | 1/1996 | Frances ................................... | 525/178 |

*Primary Examiner*—Patricia A. Short
*Attorney, Agent, or Firm*—Joseph C. Gil; Noland J. Cheung

[57] ABSTRACT

This invention relates to a process for the production of masterbatches which contain short fibres or pulps and which may be used for the production of polymer compositions or rubber compositions.

1 Claim, No Drawings

PROCESS FOR THE PRODUCTION OF MASTERBATCHES CONTAINING SHORT FIBRES OR PULPS

FIELD OF THE INVENTION

This invention relates to a process for the production of masterbatches containing short fibres or pulps and to the use thereof.

BACKGROUND OF THE INVENTION

The use of short fibres of a fibre length of some micrometres up to two or more millimetres in polymer compositions is frequently restricted or impossible because the fibres cannot adequately be incorporated or dispersed in the polymer matrix. This particularly applies to some types of high performance fibres, such as aramid fibres or aramid fibre pulp.

The short fibres or pulps to be used are conventionally in the form of tangled, wadding-like bundles which, using conventional mixing methods, cannot be incorporated and distributed in a polymer matrix, in particular elastomer compositions, or only incompletely so.

In the past, various processes have been developed for finishing fibres in order to improve the incorporability of the fibres. Thus, for example, masterbatches of various polymers are produced in mixing equipment with the addition of further auxiliary substances, as well as fibres.

A disadvantage of the process is that it does not ensure complete wetting and dispersion of the fibres (disentanglement of the fibre tangles), resulting in so-called fibre nests in the polymer.

WO 94/24 193 (PCT/US 94/03991) describes the production of a masterbatch using solvents. The polymer is dissolved in up to 4 times its quantity of solvent. The fibres are then introduced into up to 20 times their quantity of this solution. The solvent is then evaporated off. The polymer remains behind on the fibre. If the quantity of solvent is sufficiently large (at least 50% of the introduced quantity of fibre), a masterbatch is then obtained.

A disadvantage of this process is that the polymer must first be dissolved in large quantities of solvent so that the fibres may then be absorbed therein. The solvent must then be evaporated off again. This makes little economic or environmental sense.

SUMMARY OF THE INVENTION

The object was accordingly to provide a process which allows the straightforward production of masterbatches, in which short fibres are homogeneously dispersed and which contain no so-called fibre nests.

It proved possible to achieve this object by means of the process according to the invention.

The present invention provides a process for the production of polymer masterbatches containing fibres, which process is characterised in that
  a) fibres of a length of up to 20 mm, preferably between 0.2 and 5 mm, are suspended and dispersed in a 3 to 20 times, preferably 5 to 15 times excess by weight of water,
  b) a reaction component of the polymer to be produced is stirred into the dispersion from a),
  c) the water is removed mechanically, preferably by filtration or centrifugation,
  d) the fibre/reaction component mixture from c) is dried,
  e) optionally one or more further reaction components of the polymer to be produced are added to the mixture from d) and then polymerised, such that the desired masterbatch is obtained.

DETAILED DESCRIPTION OF THE INVENTION

When producing a polymer masterbatch in which the polymer is produced from a single reaction component, no further reaction component(s) is/are added in stage e). Polymerisation proceeds, for example, by heating or irradiation. This variant of the process according to the invention relates, for example, to the production of polyethylene, polypropylene, polystyrene or polyphenylene sulfide masterbatches containing fibres.

When, for example, polyurethane masterbatches are produced, the appropriate polyol may, for example, be added to the dispersion in b), while the appropriate isocyanate is then added to the mixture from d). The fibres are homogeneously dispersed in such a partially or completely polymerised masterbatch. The drying in d) preferably proceeds down to a water content of <0.5 wt. %, preferably of <0.1 wt. %.

Fillers, auxiliary substances, vulcanising agents, plasticisers or other rubber additives may also be dispersed in the aqueous dispersion together with the fibres.

The prepolymers applied onto the fibres may be crosslinked in various ways. Crosslinking may, for example, proceed by polyaddition (crosslinking by means of diisocyanates, crosslinking of unsaturated hydrocarbons with dicarboxylic acids etc.), vulcanisation or the like or polymerisation of the prepolymer by physical crosslinking, such as for example radiation curing. In the final variant, it is possible to dispense with application of a second component.

If required (before use by the customer), the masterbatch may be converted into various presentations, such as for example pellets, sheet or slabs, using conventional mixing and shaping equipment, such as for example roll mills.

The user may then mix the shaped or unshaped masterbatch into the desired quantity of a polymer composition or rubber composition in conventional mixing units.

The process according to the invention offers particular advantages in that the production of many fibres or pulps comprises an aqueous process stage, such that the process according to the invention may continue directly from this point.

Aramid fibres may in particular readily be dispersed into a masterbatch in this manner.

All possible types of masterbatches (such as for example polyurethane, polyether, polyester etc.) containing fibres (such as for example polyethylene, nylon, polyester fibres etc.) may be produced using the process according to the invention.

The following Examples are intended to illustrate the invention in greater detail.

EXAMPLES

Production of a dispersed masterbatch by introduction of a prepolymeric substance into the suspension of water and fibres and subsequent polymerisation Components and Quantities Fibres: Twaron® Pulp 1095=100 parts by weight
Reaction component: Castor oil OR=100 parts by weight Dispersion medium: Mains water=400 parts by weight The fibres are initially introduced as the dry material. Warm mains water is added and a homogeneous suspension is produced by means of a dissolver.

Reaction Conditions

Temperature: approx. 40° C.

Duration: 45 min

Rotational speed of dissolver: approx. 3000/min

Geometry (diameter of dissolver disk): 7 cm

The castor oil OR is added slowly to the suspension which is being very vigorously stirred with the dissolver. Homogenisation is also continued once addition of the oil is complete so that the oil is completely absorbed by the fibres (visual assessment).

Reaction Conditions

Duration of oil addition: 5 min

Subsequent homogenisation: 40 min

Phase separation: the water is decanted

Drying: at approx. 20 mbar and 80° C.

Duration: 4 days

Crosslinking 1

35% of maximum possible crosslinking (relative to the OH value of the castor oil)

Components & Quantities

Finished fibres (as above): =100 parts by weight

Castor oil OR: =50 parts by weight

Dioctyl adipate (plasticiser): =50 parts by weight

Diphenylmethane diisocyanate: =14 parts by weight

Di-n-butyltin acetate (catalyst): =0.2 parts by weight

The finished fibres are initially placed in the kneader. The castor oil OR is introduced with continuous kneading, and dioctyl adipate then apportioned under the same conditions.

Kneader type: paddle kneader

Manufacturer: Werner & Pfleiderer

Kneader setting: 1.5 scale divisions

Temperature: approx. 20° C.

Duration of mixing: 20 min

After mixing, the isocyanate is added. Once addition of the isocyanate is complete, the crosslinking catalyst, di-n-butyltin acetate, is added dropwise and the entire mixture homogenised again.

Kneader setting: 2.5 scale divisions

Duration of mixing: 30 min

Appearance: yellowish, loose flakes

Crosslinking 2

200% of maximum possible crosslinking (relative to the OH value of the castor oil)

Components & Quantities

Finished fibres (as above): =50 parts by weight

Dioctyl adipate (plasticiser): =100 parts by weight

Diphenylmethane diisocyanate: =20 parts by weight

Di-n-butyltin acetate (catalyst): =0.2 parts by weight

The finished fibres are initially placed in the kneader. The mixture of the other components is introduced with continuous kneading.

Kneader type: paddle kneader

Manufacturer: Werner & Pfleiderer

Kneader setting: 1.5 scale divisions

Temperature: approx. 20° C.

Duration of mixing: 30 min

Appearance: formation of flakes

What is claimed is:

1. Process for the production of a polymer masterbatch which contains short fibres or pulps characterised in that a) fibres of a length of up to 20 mm are suspended and dispersed in a 3 to 20 times excess by weight of water, b) a reaction component of the polymer to be produced is stirred into the dispersion from a), c) the water is removed mechanically, d) the fibre/reaction component mixture from c) is dried, e) optionally one or more further reaction components of the polymer to be produced are added to the mixture from d) and then polymerised, such that the desired masterbatch is obtained.

* * * * *